United States Patent
Slayton et al.

(10) Patent No.: US 11,537,625 B1
(45) Date of Patent: Dec. 27, 2022

(54) USING STRUCTURED DATA TEMPLATES AND INVOCATION STATEMENTS TO DYNAMICALLY DEFINE VALUES FOR EFFICIENT DATA ENCODING

(71) Applicant: Amazon Technologies, Inc., Seattle, WA (US)

(72) Inventors: Zachary Paul Slayton, New York, NY (US); Tyler Gregg, Seattle, WA (US); Therapon Skoteiniotis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 16/796,716

(22) Filed: Feb. 20, 2020

(51) Int. Cl.
*G06F 16/2458* (2019.01)
*G06F 16/28* (2019.01)
*G06F 16/22* (2019.01)

(52) U.S. Cl.
CPC ...... *G06F 16/2458* (2019.01); *G06F 16/2282* (2019.01); *G06F 16/284* (2019.01)

(58) Field of Classification Search
CPC . G06F 16/2458; G06F 16/284; G06F 16/2282
USPC ........................................................ 707/769
See application file for complete search history.

(56) References Cited

U.S. PATENT DOCUMENTS

| 6,119,079 A * | 9/2000 | Wang ...................... G06F 9/454 704/8 |
| 2005/0234894 A1 * | 10/2005 | Tenazas ................ G06F 16/958 |
| 2006/0265410 A1 | 11/2006 | Christianson et al. |
| 2008/0040657 A1 | 2/2008 | Kuznetsov et al. |

* cited by examiner

*Primary Examiner* — Hung T Vy
(74) *Attorney, Agent, or Firm* — Robert C. Kowert; Kowert, Hood, Munyon, Rankin & Goetzel, P.C.

(57) ABSTRACT

Structured data templates and invocation statements may be used to dynamically define values, which allows for more efficient data encoding than traditional techniques. A given structured data template may be assigned a template identifier. A writer may generate an invocation statement that references a template identifier for a particular structured data template in order to generate a more compact representation of a structured portion of source data (based on the structured data template matching the structured portion of data). The structured data template may specify that any number of the fields is an "unassigned" field. The invocation statement may specify values for these fields, resulting in a more compact representation of the structured portion of data. The use of an invocation statement and a structured data template eliminates the repetitive scaffolding of an object being written out.

20 Claims, 11 Drawing Sheets

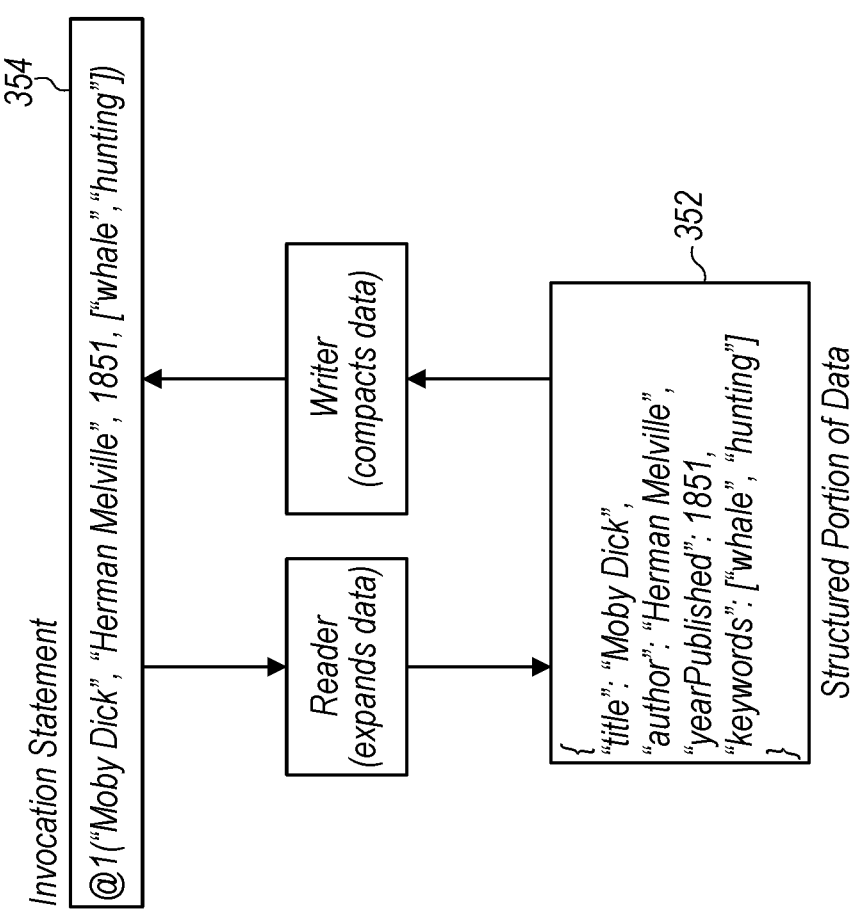

USING STRUCTURED DATA TEMPLATES AND INVOCATION STATEMENTS TO DYNAMICALLY DEFINE VALUES FOR EFFICIENT DATA ENCODING

BACKGROUND

In computer and data storage systems, data is typically stored using a schemaful format (e.g., Protobuf or other schema-based formats) or using a self-describing format (e.g., JavaScript Object Notation ("JSON")). When a schemaful format is used, each type of value being written adheres to a well-specified definition. Writers may write data values for which a type definition has been provided, and readers use a copy of that type definition in order to read the data back in. These restrictions result in fast and highly compact encodings when using schemaful formats. In comparison, self-describing formats can encode arbitrary, heterogeneous values with no formal specification. Readers of these formats can parse data without relying on any external resources. Self-describing formats are very flexible, but are often less compact and require more resources to process. Furthermore, self-describing formats are often used to write data that has a de-facto schema, leading to a large amount of data repetition.

BRIEF DESCRIPTION OF THE DRAWINGS

FIG. 3A is a logical block diagram illustrating a template table that includes a structured data template, according to some embodiments.

FIG. 3B is a logical block diagram illustrating expansion of an invocation statement into a structured portion of data based on the structured data template of FIG. 3A, according to some embodiments.

Figure 1:
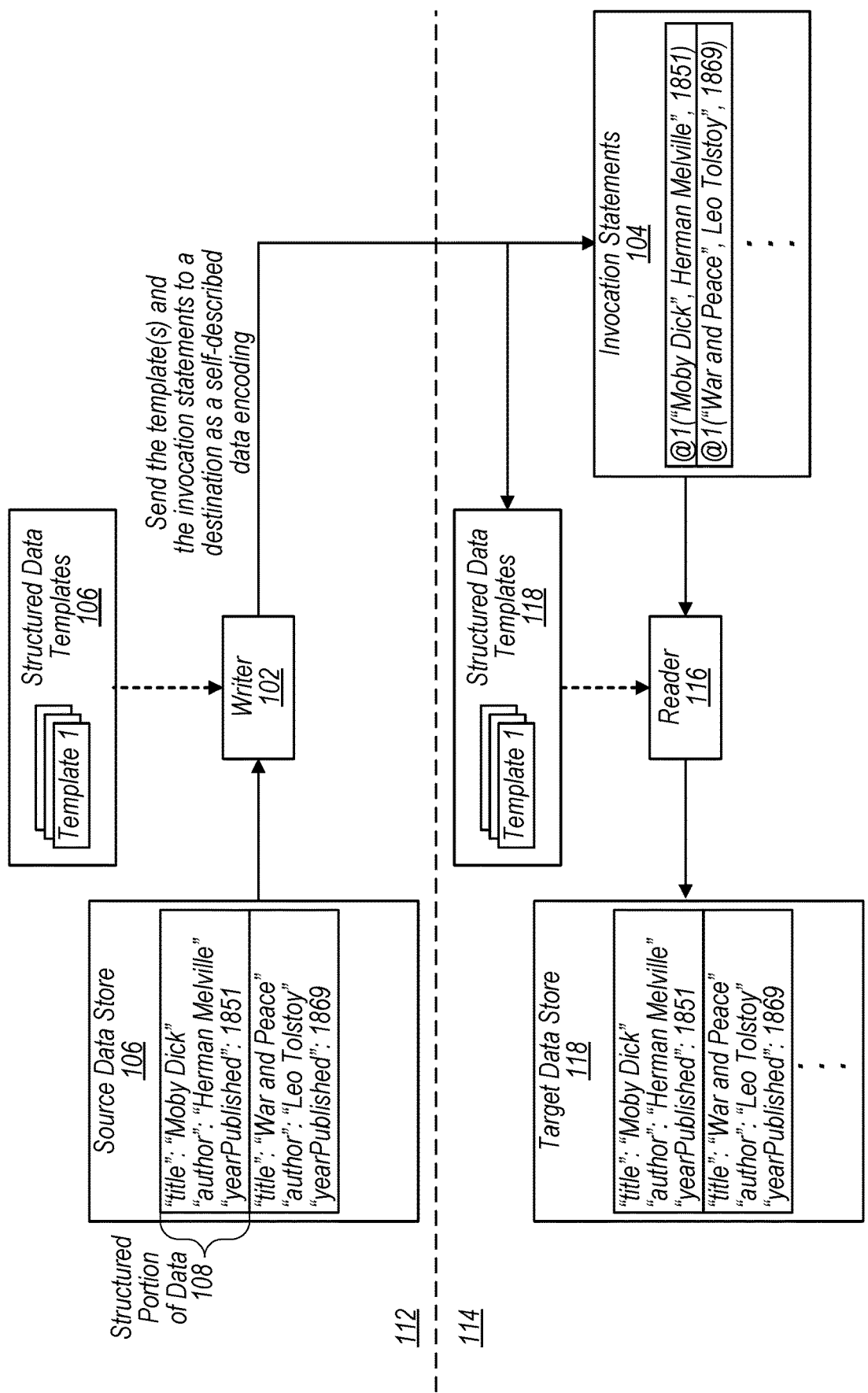
FIG. 1 is a logical block diagram illustrating using structured data templates and invocation statements to dynamically define values for efficient data encoding, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement structured data templates and invocation statements to dynamically define values for efficient data encoding, according to some embodiments. In embodiments, a structured data template may be considered a "dynamically defined value" template. In various embodiments, structured data templates provide self-describing formats with a way to shrink their data size and increase their read/write performance without being bound by the restrictions that apply to schemaful formats. Therefore, embodiments may provide for a substantial reduction in the size of self-described data streams.

In embodiments, a table may include one or more structured data templates (e.g., one or more definitions of structured data templates), and each structured data template may be assigned a different template identifier. Therefore, each template identifier may uniquely identify a particular structured data template with respect to any other structured data templates. In embodiments, a writer may generate an invocation statement that references a template identifier for a particular structured data template in order to generate a more compact representation of source data based on the structured data template. The more compact representation of source data may take up much less storage space and may consume much less transmission bandwidth when sending data to another destination. Therefore, embodiments may reduce the amount of space needed to store data (freeing up room to store other data) and/or may reduce the amount of time required to transmit the data to another destination (freeing up more bandwidth to transmit other data).

In embodiments, a structured data template that corresponds to a given template identifier may specify (e.g., include) zero or more fields. In embodiments, a given field includes a field name and a field value (e.g., a key-value pair). Therefore, to specify the given field, the structured data template may specify a field name and/or a field value (the value may be assigned or unassigned). For example, a structured data template may specify a field name of "City" and another field name of "State." In embodiments, a value may be assigned to zero or more fields of the structured data template. For example, the structured data template may specify "New York" for the City and "NY" for the State.

In various embodiments, the structured data template may specify that any number of the fields is an "unassigned" field (e.g., a field value has not been assigned to the field). In embodiments, the structured data template may include an indicator (e.g., @ or another other suitable indicator) as the field value for a particular field, which specifies that the particular field is an unassigned field. For example, a structured data template may specify "City" as the field name for a particular field and specify "@_" as the field value for the particular field. As discussed below, this may allow for a more efficient/compact data encoding than traditional techniques.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 9 and described below.

This specification begins with a general description of using structured data templates and invocation statements to dynamically define values for efficient data encoding. A number of different methods and techniques to implement structured data templates and invocation statements are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating using structured data templates and invocation statements to dynamically define values for efficient data encoding, according to some embodiments. As shown, a writer 102 may generate different invocation statements 104 based on a structured data template 106 and structured portions of data 108 stored at a source data store 110.

In the depicted embodiment, a computing system 112 (e.g., example computing system 900) may include and/or implement the writer 102, the structured data templates 106, and/or the source data store 110 and another computing system 114 may include and/or implement a reader 116, structured data templates 118, and/or the target data store 120. In embodiments, the computing system 112 may be remote with respect to the other computing system 114. For example, the computing system 112 may communicate with the other computing system 114 via a wide-area network (e.g., the Internet). In some embodiments, the computing system 112 and the other computing system 114 may be different computing systems within the same local network (e.g., within a service provider network or a client network). In some embodiments, the computing system 112 and the computing system 114 are the same computing system. Therefore, the writer 102 and the reader 116 may be on the same computing system/machine.

As shown, each structured portion of data stored at the source data store 110 includes three fields that describe a different book: a title, an author, and a year published. For example, structured portion of data 108 includes the data "title": "Moby Dick" followed by "author": "Herman Melville" on the next line, followed by "yearPublished": 1851 on the next line. Another structured portion of data that describes another book (War and Peace) begins on the next line.

In embodiments, any other data and/or metadata may be included as part of the structured data. For example, data indicating the end of a line or a carriage return may be included at the end of each line of data. In some embodiments, the source data store may store any number of structured portions of data (e.g., describing different books). In embodiments, the source data store 110 may store any number of different types of structured portions of data. For example, the source data store 110 may store data describing any number of books, cars, and movies, where the structured portions of data that describe books include different fields than the structured portions of data that describe cars and movies. In some embodiments, a given structured portion of data may be encoded and/or processed without employing a template invocation and therefore be processed as "raw data" (e.g., without processing, compacting, or otherwise encoding the data). Similarly, any other type of data (e.g., with no identifiable structure) may also be processed as raw data.

As shown, the writer 102 may obtain and/or access any number of structured data templates. A particular structured data template may be used by the writer 102 to generate one or more invocation statements based on one or more corresponding structured portions of data. In embodiments, an invocation statement may be a more compact representation of a structured portion of data. Therefore, less storage space is needed to store an invocation statement than the corresponding structured portion of data. For example, the writer 102 may generate the two invocation statements 104 based on the two structured portions of data describing books shown in the source data store 110. Techniques for generating the invocation statements 104 based on the structured data templates and structured portions of source data are described below for FIGS. 2A, 2B, and other figures herein.

As depicted, the computing system 112 may send the structured data templates 106 and the invocation statements 104 to the computing system 114 for processing be the reader 116. Thus, the structured data templates 118 may be the same templates as the structured data templates 106. The reader 116 may read the invocation statements 104 and associate one or more field names, field values, and/or relationships based on the structured data templates. For example, the reader may write out the different portions of structured data 108 to the target data store 120 based on the structured data templates 118 and the invocation statements 104 (described in detail for FIG. 2B). As another example, a consumer process/application (e.g., executing code) may consume the field names, field values, and/or relationships from the reader. In various embodiments, "associating" one or more field names, field values, or relationships may include populating a given template with the one or more field names, field values, or relationships (which may then be consumed by a consumer process/code) and/or storing the one or more populated field names, field values, or relationships to one or more data stores.

In the example embodiment, the reader 116 reads/identifies the first invocation statement, determines that the invocation statement refers to a particular structured data template (e.g., "Template 1"), and generates/writes (e.g., associates) the structured portion of data 108 (describing the book "Moby Dick") to the target data store 120 based on Template 1 and the data/values provided in the invocation statement. Similarly, the reader 116 reads/identifies the next invocation statement, determines that the next invocation statement refers to the same structured data template ("Template 1"), and generates/writes (e.g., associates) another structured portion of data (describing the book "War and Peace") to the target data store 120 based on Template 1 and the data/values provided in the next invocation statement.

In embodiments, less bandwidth is consumed to transmit structured portions of data from the source data store 110 to the target data store 120 because the structured data templates and the invocation statements take up much less data than the structured portions of data. Using the example embodiments, fewer storage resources and fewer network transmission resources are required to transmit structured portions of data from the source data store 110 to the target data store 120. In some embodiments, the invocation statements may be stored for any amount of time as a backup or archive of the structured portions of data (at computing system 112, computing system 114, or any other local or remote data store). Therefore, fewer/smaller storage resources are needed to backup or archive structured portions of data.

Figure 2A:
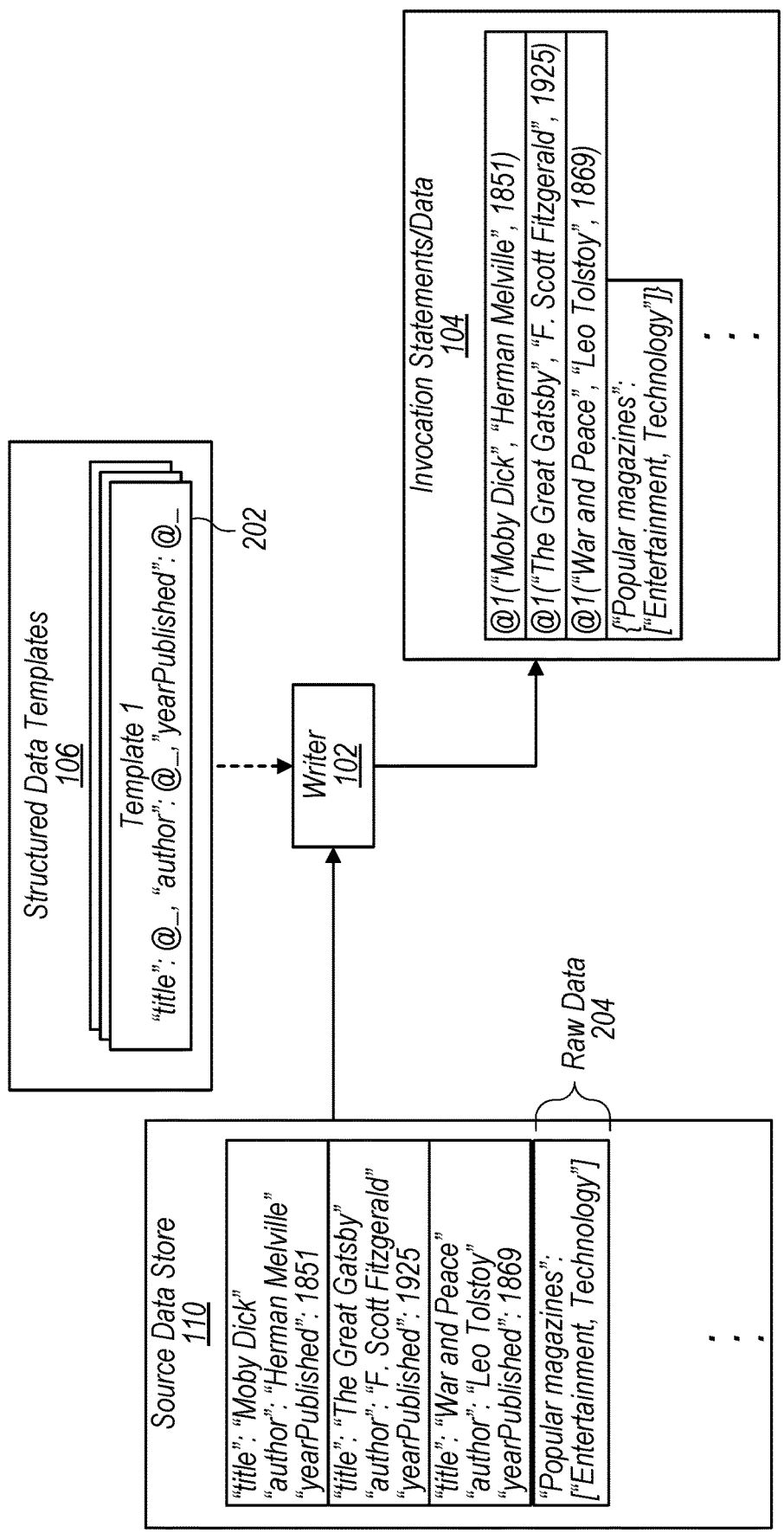
FIG. 2A is a logical block diagram illustrating a writer that generates invocation statements based on a structured data template and different portions of structured data, according to some embodiments.

FIG. 2A is a logical block diagram illustrating a writer that generates invocation statements based on a structured data template and different portions of structured data, according to some embodiments. In the depicted embodiment, the writer 102 may generate different invocation statements 104 based on a structured data template 202 and structured portions of data stored at a source data store 110.

In the example embodiment, each structured portion of data stored at the source data store 110 includes three fields that describe a different book: a title field, an author field, and a year published field. For example, structured portion of data 108 includes the field "title: Moby Dick," followed by the field "author: Herman Melville," on the next line, followed by the field "yearPublished: 1851," on the next line. The next two structured portions of data describe the books "The Great Gatsby" and "War and Peace," respectively.

In the depicted embodiment, the writer 102 generates the invocation statements 104 based on the structured data template 202 and the different structured portions of data of the source data store 110 that describe different books. As shown, the structured data template 202 specifies that three fields are "unassigned" fields (e.g., a field value has not been assigned the three fields). The structured data template specifies that a field is unassigned by specifying an indicator (e.g., "@_" or another other suitable indicator comprising one or more characters and/or numbers) as the field value for the field. Therefore, the structured data template 202 specifies "@_" as the field value for the field named "title," the field named "author," and the field named "yearPublished."

The structured data template 202 also specifies one or more relationships between different fields. For example, the structured data template 202 specifies the order of the fields with respect to each other, by listing the title field, followed by the author field, followed by the yearPublished field. Note that the relationship order between the fields of the structured data template 202 determines the relationship order between the field values of the invocation statements.

For example, the first statement shows the value of the title (Moby Dick), the value of the author (Herman Melville), and the value of the year of publication (1851).

In embodiments, a given invocation statement 104 based on the given structured data template and a given structured portion of the source data includes 1) a reference to a template identifier of the given structured data template ("@1"); and 2) a value for zero or more of the unassigned field values, which corresponds to the field values of the given structured portion of the source data. For example, the first invocation statement includes the reference "@1."

As shown, the first invocation statement also includes 1) the value of the unassigned "title" field, which is the "title" field value of the first structured portion of data ("Moby Dick"), the value of the unassigned "author" field, which is the "author" field value of the first structured portion of data (Herman Melville), and the value of the unassigned "yearPublished" field, which is the "yearPublished" field value of the first structured portion of data (1851). As depicted, the other two invocation statements 104 are also generated in the same way (based on the structure data template 202) for the other two structured portions of data.

In the example embodiment (and in other figures), certain characters, spacing, and/or formats are used for the structured data portions, templates, tables, and invocation statements. However, any other suitable characters, spacing, and/or formats may be used for the structured data portions, templates, tables, and invocation statements (e.g., to indicate relationships and/or structure such as order of fields, spacing, new lines, nested structures, arrays, etc.), in various embodiments. For example, the template 202 of FIG. 2A uses double quotes around field names, uses a colon and space (":") to separate the field names from the "unassigned" indicator (@_), and uses a comma and space to separate the "unassigned" indicator from the next field name. However, various other embodiments may use any other number and/or combination of characters, spacing, and/or formats to identify fields, field names, field values, or any other type of data and/or metadata.

In embodiments, the writer may identify a given structured data portion of the source data store 110 by determining that the field names and/or one or more relationships specified by the template (e.g., template 202) match the field names and/or one or more relationships of the given structured portion of data. For example, the writer 102 may determine that the fields and/or relationships of the fields of a particular portion of structured data (describing the book "Moby Dick") match the field names and/or relationships specified by the structured data template 202.

In response to determining that the fields and/or relationships of the fields of the particular portion of structured data (describing the book "Moby Dick") match the field names and/or relationships specified by the structured data template 202, the writer may generate an invocation statement 104 based on the structured data template 202 and the particular structured portion of the source data. In the depicted embodiment, the invocation statement includes a reference to a template identifier of the structured data template 202 ("@1"), and a value for at least one of the unassigned field values based on the structured portion of the source data ("Moby Dick", "Herman Melville", 1851).

In the example embodiment, the invocation statement indicates a type of value for each of the unassigned fields. The double quotes around Moby Dick and Herman Melville indicate that the values are strings. The lack of double quotes around 1851 indicate that the value is an integer. In embodiments, any character(s) or combination of characters may be used to indicate any type of value. In some embodiments, the writer determines the type of value by analyzing the content of the value and determining, based on the content, the type of value. For example, the writer may determine that the value of the yearPublished field includes only numbers, and therefore generates an invocation statement that indicates the type of value for 1851 is an integer.

In some embodiments, the writer may determine, based on analyzing metadata of the structured portion of data, the type of value for one or more of the fields. In response, the writer generates an invocation statement that indicates the type of value for the one or more fields. For example, if double quotes surround a particular field value in the source data, then the writer may generate an invocation statement that indicates the type of value for the particular field is a string. In various embodiments, a writer may be configured to indicate different types of values, based on the metadata used in the source data. For example, in some embodiments, if double quotes surround a particular field value in the source data, then the writer may generate an invocation statement that indicates the type of value for the particular field is a string, whereas in other embodiments the writer may generate an invocation statement that indicates the type of value for the particular field is an integer.

The writer may perform the same techniques/steps described above to generate any number of invocation statements. For example, the writer 102 may determine that the fields and/or relationships of the fields of the next portion of structured data (describing the book "The Great Gatsby") match the field names and/or relationships specified by the structured data template 202. In response, the writer generates another invocation statement, which is a "compacted" version of the structured portion of data describing the book "The Great Gatsby." In other words, the invocation statement is an encoded representation of the structured portion of data, such that the invocation statement takes up less storage space (e.g., takes up less bytes) than the corresponding structured portion of data. As described herein, the invocation statement may also be "expanded" into the original structured portion of data.

The structured data template 202 (Template 1) may be one of any number of structured data templates 106 that may be used by the writer to generate different invocation statements. In embodiments, the writer may identify a given structured data portion of the source data store 110 by determining that the field names and/or one or more relationships specified by one of the templates 106 match the field names and/or one or more relationships of the given structured portion of data. For example, a structured portion of data of the source data store 110 may describe a particular car model. The writer may identify the structured data portion of the source data store 110 by determining that the field names and/or one or more relationships specified by another one of the templates 106 match the field names and/or one or more relationships of the structured portion of data. The writer may then generate a corresponding invocation statement as a compacted version of the structured portion of data.

In embodiments, the structured data templates 106 are available to the writer before the writer begins analyzing the data and/or metadata of the source data store, determines matches for structured portions of data, and generates invocation statements (e.g., before a writer program/process begins executing to process/compact the data). For example, a user may create and/or configure (e.g., via a user interface and/or an application programming interface (API)) any number of structured data templates, based on knowledge of the fields (e.g., field names, field values), relationships between different fields, types of field values, etc. for each structured portion of data.

In various embodiments, the writer or another process may create and/or configure (e.g., via an application programming interface (API)) any number of structured data templates, based on analysis of the fields (e.g., field names, field values), relationships between different fields, types of field values, etc. for each structured portion of data. For example, a trained machine learning model (e.g., any form of artificial intelligence) may analyze source data, recognize a pattern of field names and/or a pattern of relationships between fields that repeats (e.g., title, author, book), and generate a structured data template to be used for structured portions of data that match the template. In various embodiments, a user may generate zero or more of the templates and/or a machine learning model may generate zero or more of the templates. Therefore, any number of structured data templates may be generated by a user and/or machine learning model.

In some embodiments, the writer (or another process) may dynamically create and/or configure any number of new structured data templates during (e.g., concurrent with) generation of invocation statements using already existing templates. For example, while processing source data of a source data store, the writer (e.g., using a machine learning model) may recognize a new pattern of field names and/or a pattern of relationships between fields that repeats (e.g., title, author, yearPublished), and generate a structured data template to be used for structured portions of data that match the template. In embodiments, in response to generating the new structured data template, the writer may send the new structured data template to a destination so that a reader at the destination is able to convert/expand invocation statements based on the new structured data template.

Using these techniques, a writer is able to continuously and dynamically adapt to new types of source data by generating additional templates on the fly. Therefore, even if a group of templates is initially provided, a writer may improve compaction of the source data by generating new templates (e.g., while processing the source data using initially provided templates). In other words, the amount of space taken up may be reduced even further by compacting additional portions of the source data using the new templates. During processing, the new templates may also be sent to the destination so they are available for readers to expand the data at the destination. In embodiments, any number of writers and/or readers may be used. For example, the number of instances of writers and/or readers may be scaled up to increase throughput and reduce the amount of time to compact/expand data (assuming resources are available).

In embodiments, a source data store may include any amount of raw data that is not compacted by a writer. For example, the source data store 110 includes at least one portion of raw data 204 that does not match any structured data template and therefore is not compacted. As shown, the writer may process the structured portions of data along with the raw data so that the order of the invocation statements/data 104 corresponds to the order of the corresponding structured portions of data and raw data as stored in the source data store 110. In embodiments, a given structured portion of data may be encoded and/or processed without employing a template invocation and therefore may be processed as raw data (e.g., without processing, compacting, or otherwise encoding the data). Similarly, any other type of data (e.g., data with no identifiable structure) may also be processed as raw data. Therefore, in embodiments, the raw data 204 may be processed as raw data, regardless of whether the raw data 204 is structured in any particular manner. In the example embodiment, the writer adds curly braces around each portion of raw data. However, in some embodiments, the writer may add any other character(s) or may not modify the raw data at all.

Figure 2B:
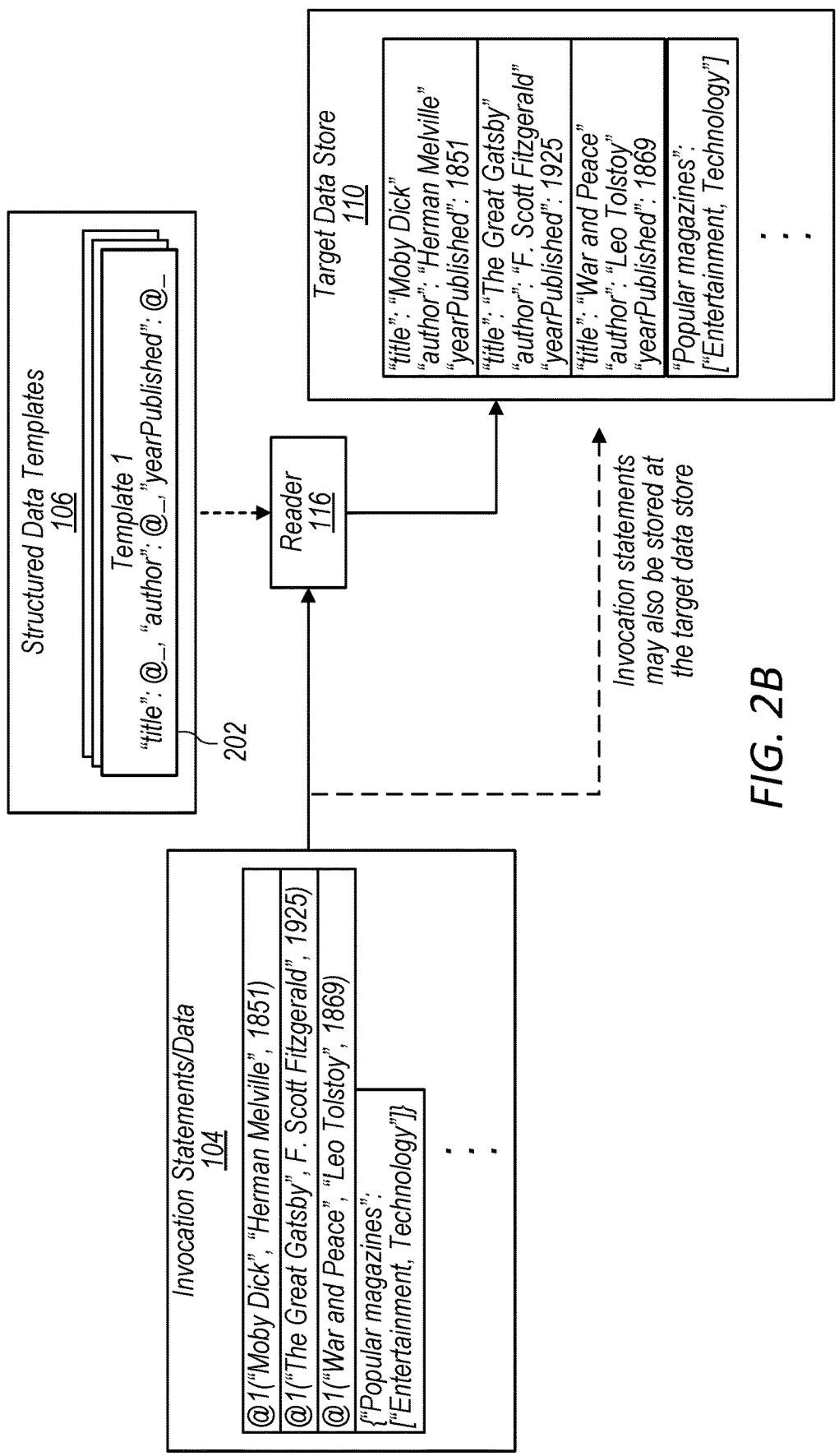
FIG. 2B is a logical block diagram illustrating a reader that reads invocation statements and writes out different portions of structured data based on the structured data template and the invocation statements, according to some embodiments.

FIG. 2B is a logical block diagram illustrating a reader that reads invocation statements and writes out (e.g., associates) different portions of structured data based on the structured data template and the invocation statements, according to some embodiments. In embodiments, the invocation statements 104 may be received by the reader 116 from the writer 102 (or from another component) of FIG. 2A (e.g., via transmission from another/remote computing system). Thus, the invocation statements 104 may include some or all of those of FIG. 2A.

Similarly, the structured data templates 106 may be received by the reader 116 from the writer 102 (or from another component) of FIG. 2A (e.g., via transmission from another/remote computing system). Thus, structured data templates 106 may include some or all of those of FIG. 2A.

In the example embodiment, the reader 116 reads/identifies a given invocation statement (e.g., the statement that includes "Moby Dick"), determines that the invocation statement refers to a particular structured data template (e.g., "Template 1"), and associates one or more field names, field values, and/or relationships based on the structured data templates.

For example, the reader may expand an invocation statement to generate/write (e.g., associate) a structured portion of data 108 (e.g., describing the book "Moby Dick") to the target data store 120 based on the particular structured data template (Template 1) and the data/values provided in the invocation statement ("Moby Dick", "Herman Melville", 1851). In some embodiments, a consumer process/application (e.g., executing code) may consume the field names, field values, and/or relationships from the reader. For example, the reader may populate a given template with the one or more field names, field values, or relationships (which may then be consumed by a consumer process/code). As shown, the reader may also store the invocation statements at the target data store (or another data store), which may serve as a compact representation of the data at the target system.

As shown, the reader 116 reads/identifies the next invocation statement, determines that the next invocation statement refers to the same structured data template ("Template 1"), and generates/writes (e.g., associates) another structured portion of data (describing the book "The Great Gatsby") to the target data store 120 based on Template 1 and the data/values provided in the next invocation statement ("The Great Gatsby", "F. Scott Fitzgerald", 1925). In embodiments, the reader may generate/write (e.g., associate) any number of structured portions of data based on any number of different templates that correspond to different types of structured data. For example, one type of structured portion of data may describe books, another may describe cars, and another may describe movies. The fields and/or relationships between fields may differ for different types of structured portions of data.

As depicted, the invocation statements/data 104 processed by the reader may include any amount of raw data (e.g., data that is not in the form of an invocation statement/table/template) that occurs before, between, and/or after invocation statements. In embodiments, when the reader encounters raw data, the reader (or another consumer process) may simply consume/write out the raw data in full. In embodiments, this may allow the reader and/or other consumer code to process all of the values in the stream of invocation statements/data 104 uniformly (e.g., the invocation statements may be an encoding detail that is invisible to consumer-level code). In embodiments, a consumer process/code may consume the data from the reader instead of or in addition to storing the data to the target data store. In the depicted embodiment, the reader removes the curly braces around the raw data as part of the processing of the raw data. In some embodiments, the raw data has no characters that need to be removed as part of processing the raw data.

FIG. 3A is a logical block diagram illustrating a template table that includes a structured data template, according to some embodiments. The template table 302 includes a structured data template (Template 1) that specifies four different fields respectively named title, author, yearPublished, and keywords.

As depicted, the structured data template also specifies an indicator (e.g., a "blank" indicator) in each field value, which indicates that each of the fields is unassigned. In the example embodiment, the characters "@_" is the indicator that a given field is unassigned. In embodiments, any other suitable combination of one or more characters may be used. In various embodiments, any suitable human-readable format or machine-readable format may be used for any of the data, fields, etc. described herein. For example, if a binary format is used, then an unassigned value may be denoted by a particular byte (or byte sequence).

In some embodiments, one or more of the field values may be specified (e.g., "hard-coded"). For example, if the only source data that is being compacted is for books that were published in 1984, then the structured data template (or a newly created template similar to the template) may specify the value "1984" as the field value for the field named yearPublished.

FIG. 3B is a logical block diagram illustrating expansion of an invocation statement into a structured portion of data based on the structured data template of FIG. 3A, according to some embodiments. As shown, the structured portion of data 352 may be compacted by a writer to generate the invocation statement 354. The invocation statement may also be expanded by a reader to generate the structured portion of data 352.

In embodiments, values of any type may be specified by the invocation statement. For example, the invocation statement specifies that Moby Dick and Herman Melville are strings, 1851 is an integer, and the words "whale" and "hunting" belong to a particular list (e.g., a list of keywords, as suggested by the field name). In embodiments, any other type of data used in any particular data store and/or application may be specified (e.g., lists, nested structures, objects, timestamps, etc.).

In the depicted embodiment, a template identifier of "1" may be established for the structured data template of FIG. 3A. To compact the structured portion of data 352, the writer may determine that the structured portion of data matches Template 1 (using matching techniques described herein), and write out the template reference in the invocation statement (@1). Based on that structured data template, the writer may then generate the rest of the invocation statement 354. At a later point, a reader may then expand the invocation statement 354 to re-construct the structured portion of data 352 (e.g., at another computing system or another data store).

In embodiments, using an invocation statement and/or a structured data template may eliminate repetitive "scaffolding" of an object being associated (e.g., an object being provided to a consumer or being written out to a data store, such as field names, metadata describing data structure, relationships between fields, data types, etc.). Embodiments may greatly reduce the size of self-describing data streams, compared to traditional techniques. In some embodiments, templated data (e.g., in the form of invocation statements) is faster to both read and associate/write out to a data store. When reading by a reader, values that are defined in a structured data template can be cached in memory and do not need to be re-parsed and/or re-validated. For example, the strings "title", "author", "yearPublished", and "keywords" do not need to be evaluated for compliance with UTF-8 each time @1 is invoked by the reader. In embodiments, this may allow for faster storage to a data store or may allow a consumer process/application to consume the data at a much faster rate than would otherwise be possible using traditional techniques. As discussed herein, template invocations may be substantially smaller than the expanded alternative.

In various embodiments, template definitions may be an optional feature and may not restrict what data can be written in formats that employ them. Unlike schemaful languages, which may be required to operate within the confines of their data definitions, formats using template values may not need to sacrifice expressiveness.

Figure 4A:
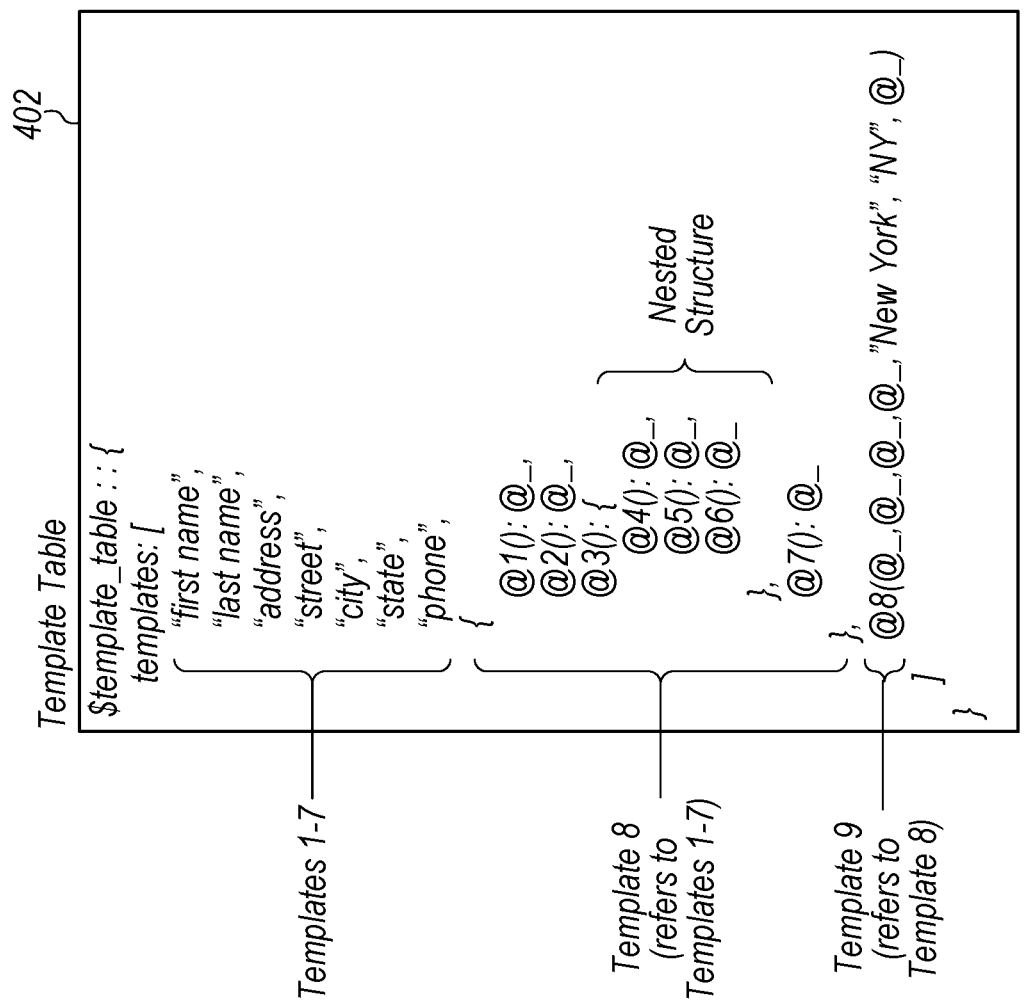
FIG. 4A is a logical block diagram illustrating a template table that defines templates based on other templates, according to some embodiments.

FIG. 4A is a logical block diagram illustrating a template table that defines templates based on other templates, according to some embodiments. In embodiments, a template table may define any number of templates.

As shown, the template table 402 includes seven templates that may be considered zero-parameter templates. In other words, the templates may be invoked in order to use a particular value specified by the template. For example, Template 1 is defined as the string "first name," Template 2 is defined as the string "last name," etc. Template 8 defines fields based on templates 1-7 (e.g., by specifying invocation statements for templates 1-7). For example, Template 8 specifies the field name for the first field to be "first name," and the field value for the first field as a blank ("@_"). As depicted, Finally, Template 9 is specified by an invocation statement that invokes Template 8. As shown, the invocation statement provides "blank" indicators for the first four parameters, provides field values for the next two parameters ("New York" and "NY"), and provides another blank indicator for the last parameter.

In embodiments, a structured data template may specify any number of relationships (e.g., structural relationships) between any number of fields. For example, Template 8 specifies a particular order/sequence of seven fields according to the order that they are listed in the template definition. As another example, the curly brackets surrounding the third, fourth, and fifth fields specifies that those fields belong to a nested structure (and that the other fields do not).

Figure 4B:
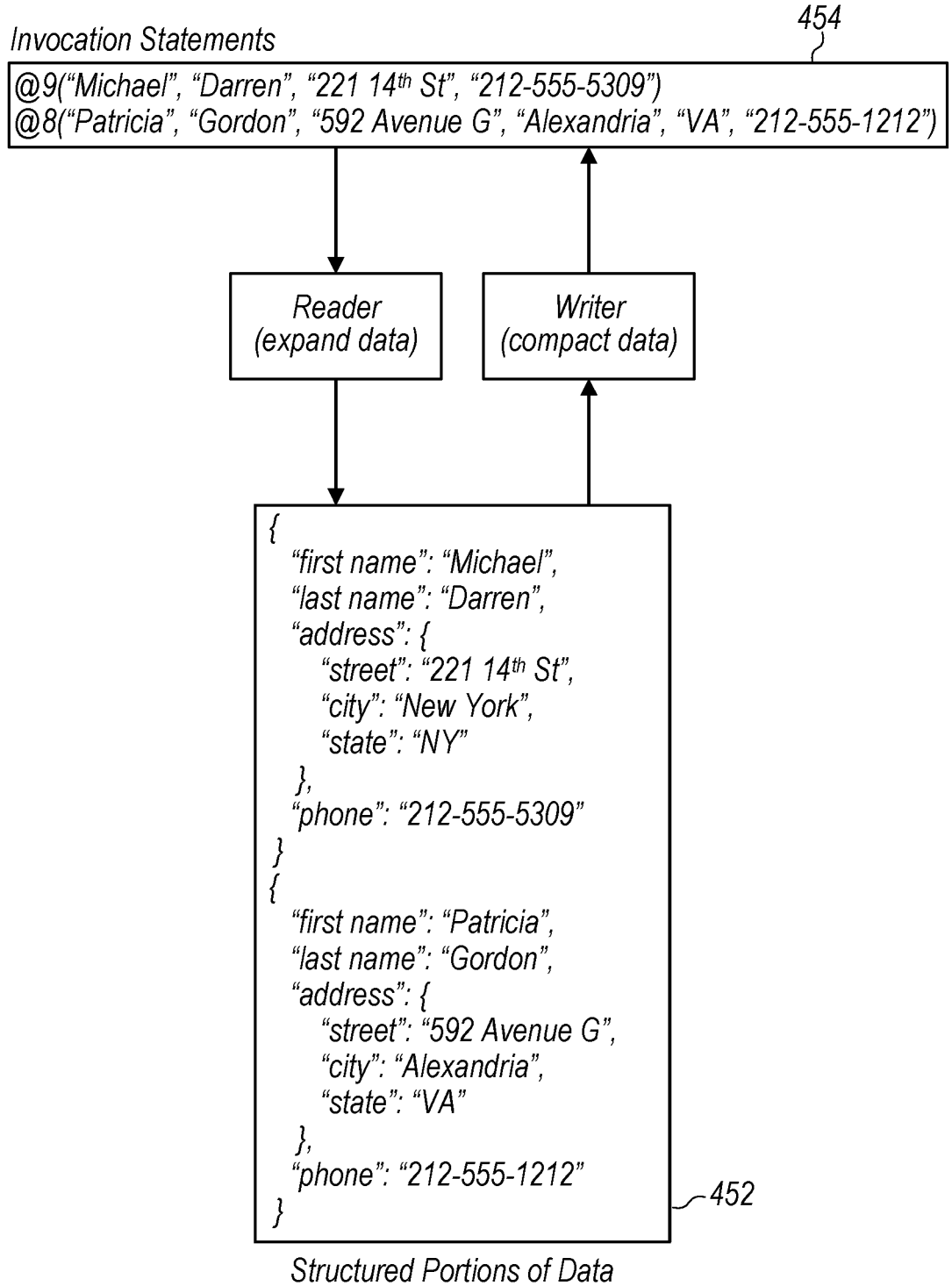
FIG. 4B is a logical block diagram illustrating expansion of invocation statements into structured portions of data based on the structured data templates of FIG. 4A, according to some embodiments

FIG. 4B is a logical block diagram illustrating expansion of invocation statements into structured portions of data based on the structured data templates of FIG. 4A, according to some embodiments. As shown, the structured portions of data 452 may be compacted by a writer to generate the invocation statements 454. The invocation statements may also be expanded by a reader to generate the structured portions of data 452. In embodiments, any number of invocation statements may be used to invoke Template 8, Template 9, or any other templates (depending on what structured portions of data were compacted).

In the depicted embodiment, the writer generates the first invocation statement based on Template 9 and the first structured portion of data (e.g., personal data for Michael Darren). In embodiments, the writer may determine that the fields and the relationships between fields (e.g., the address list) and the values for city and state of the first structured portion of data for Michael Darren match the fields and the relationships between fields and the values for city and state specified by Template 8 (since template 9 is defined based on template 8). Therefore, in various embodiments, the writer may take into account field values (in addition to field names and/or relationships between fields).

As shown, the writer also generates the next invocation statement based on Template 8 and the next structured portion of data (e.g., personal data for Patricia Gordon). In this case, the writer determines that the fields and the relationships between fields (e.g., the address list) of the next structured portion of data for Patricia Gordon match the fields and the relationships between fields specified by Template 8. Note that the invocation statement for Patricia's data specifies the city and state, but the invocation statement for Michael's data does not specify the city and state, because Template 9 already specifies "New York" and "NY" as the city and state. As shown, the reader may expand the invocation statements 454 to re-construct the structured portions of data 452 (e.g., at another computing system or another data store).

Figures 5A, 5B:
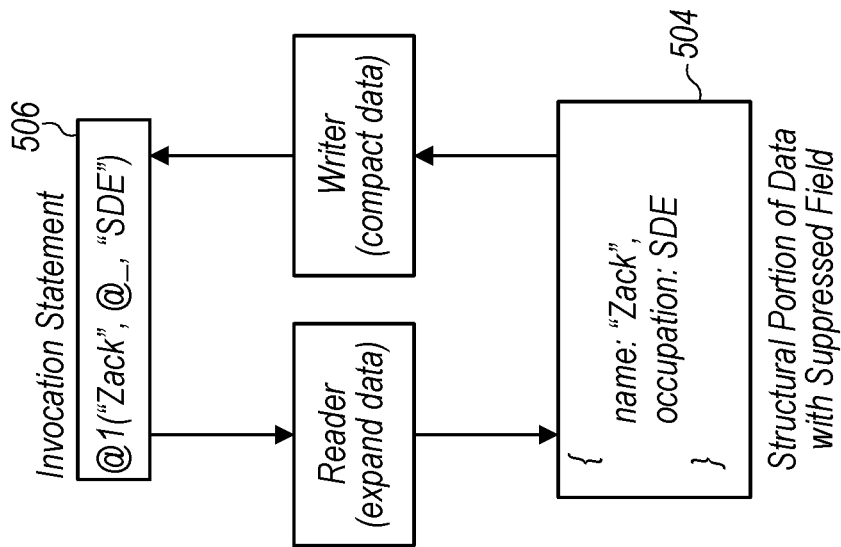
FIG. 5A is a logical block diagram illustrating a template table that includes a structured data template, according to some embodiments.
FIG. 5B is a logical block diagram illustrating expansion of an invocation statement that includes a suppressed field into a structured portion of data based on the structured data template of FIG. 5A, according to some embodiments.

FIG. 5A is a logical block diagram illustrating a template table that includes a structured data template, according to some embodiments. The template table 502 includes a structured data template (Template 1) that specifies three different fields respectively named name, employeeID, and occupation. As depicted, the structured data template also specifies a "blank" indicator in each field value.

FIG. 5B is a logical block diagram illustrating expansion of an invocation statement that includes a suppressed field into a structured portion of data based on the structured data template of FIG. 5A, according to some embodiments. As shown, the structured portion of data 504 may be compacted by a writer to generate the invocation statement 506. The invocation statement 506 may also be expanded by a reader to generate the structured portion of data 504.

In the depicted embodiment, a template identifier of "1" may be established for the structured data template of FIG. 5A. To compact the structured portion of data 504, the writer may determine that the structured portion of data matches Template 1 (using matching techniques described herein), and write out the template reference in the invocation statement (@1). Based on that structured data template, the writer may then generate the rest of the invocation statement 506. In the depicted example, the writer specifies "@_" as the value for the employeeID field, to indicate that the field is suppressed (e.g., the field does not exist in the structured portion of data 504). At a later point, a reader may then expand the invocation statement 506 to re-construct the structured portion of data 504, without writing the employeeID field (e.g., at another computing system or another data store).

Figures 6A, 6B:
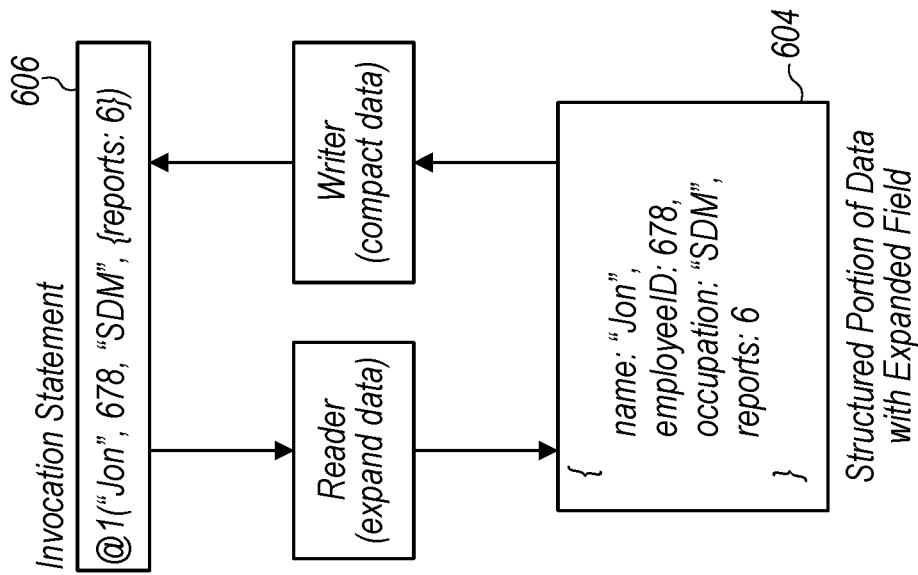
FIG. 6A is a logical block diagram illustrating a template table that includes a structured data template, according to some embodiments.
FIG. 6B is a logical block diagram illustrating expansion of an invocation statement that includes an expanded field into a structured portion of data based on the structured data template of FIG. 6A, according to some embodiments.

FIG. 6A is a logical block diagram illustrating a template table that includes a structured data template, according to some embodiments. The template table 602 includes a structured data template (Template 1) that specifies three different fields respectively named name, employeeID, and occupation. As depicted, the structured data template also specifies a "blank" indicator in each field value. The template table 602 also includes another structured data template (Template 2) that specifies a field named reports, with a "blank" indicator as the field value.

FIG. 6B is a logical block diagram illustrating expansion of an invocation statement that includes an expanded field into a structured portion of data based on the structured data template of FIG. 6A, according to some embodiments. As shown, the structured portion of data 604 may be compacted by a writer to generate the invocation statement 606. The invocation statement 606 may also be expanded by a reader to generate the structured portion of data 604.

In the depicted embodiment, a template identifier of "1" may be established for the structured data template of FIG. 6A. To compact the structured portion of data 604, the writer may determine that the structured portion of data matches Template 1 (using matching techniques described herein), and write out the template reference in the invocation statement (@1). Based on that structured data template, the writer may then generate the rest of the invocation statement 606. In the depicted example, the writer specifies an additional field named "reports" with a value of "6," to specify the additional field that was encountered in the structured portion of data 604. Thus, in embodiments, a given structured portion of data does not need to be an exact match for a particular template in order for a writer to generate an invocation statement for the particular template. At a later point, a reader may then expand the invocation statement 606 to re-construct the structured portion of data 604, adding the extra reports field (e.g., at another computing system or another data store).

In some embodiments, invocation statements may themselves include one or more different invocation statements (e.g., as one or more parameters). For example, instead of specifying the additional field named "{reports: 6}," the invocation statement 606 may specify an additional invocation statement. For example, the invocation statement 606 may specify an additional invocation statement for Template 2 of FIG. 6A, and may be written as @1("Jon", 678, "SDM", @2(6)). In embodiments, this invocation statement may be expanded by the reader to become the same structured portion of data 604. In this case, "@2" will invoke Template 2 of FIG. 6A, resulting in the last line ("reports: 6"). In various embodiments, the nested invocation statements may themselves include any number of parameters/values. In embodiments, a nested invocation statement may itself include one or more nested invocation statements. In various embodiments, any number of levels of nesting of invocation statements within other invocation statements may be implemented.

Note that in various embodiments, a template may assign zero or more values to the unassigned fields of its structured template. For example, the invocation @1(@_, @_, @_) would expand to { } or the invocation @1(@_, @_, @_, {reports: 7}) would expand to {reports: 7}.

Figure 7:
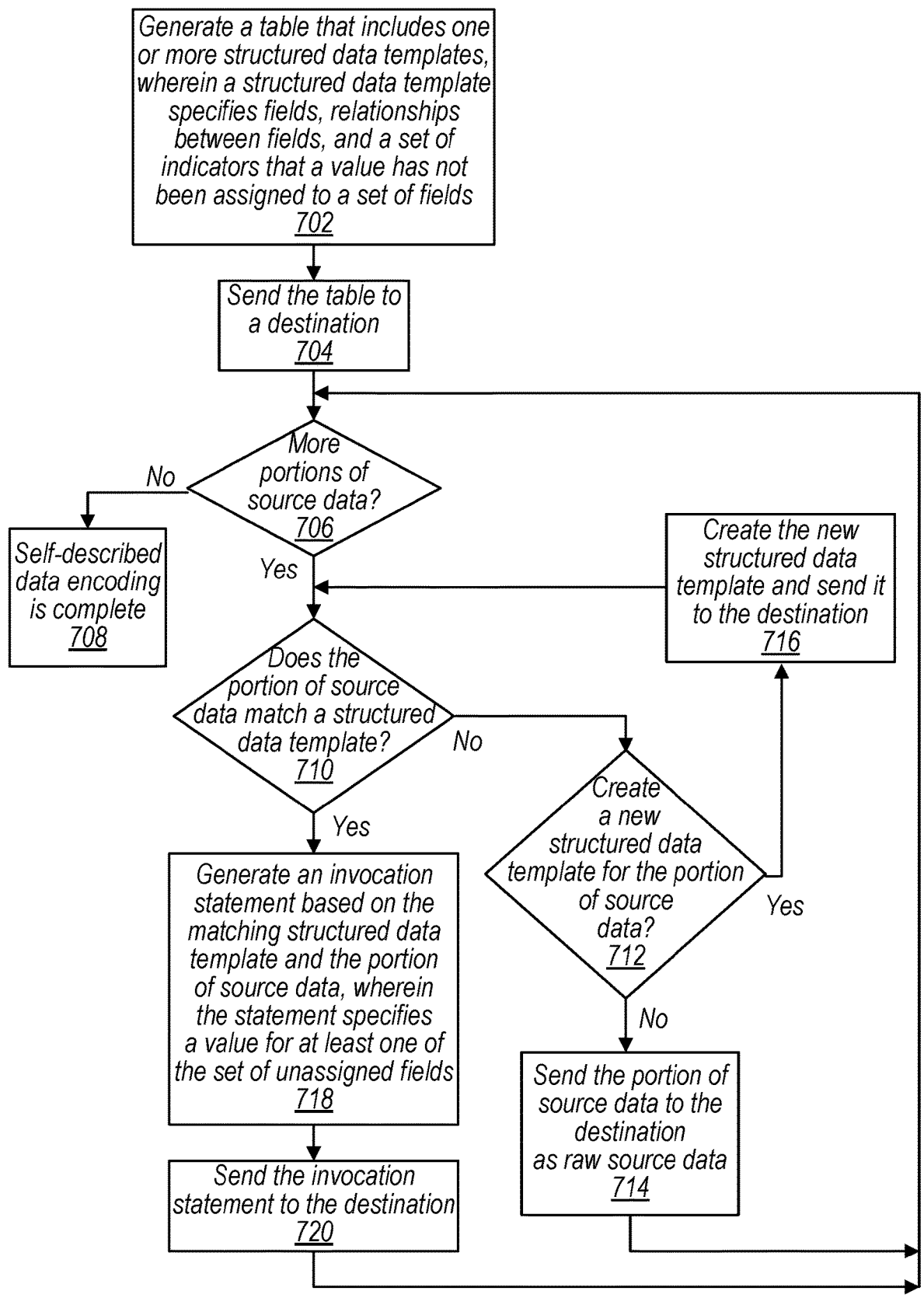
FIG. 7 is a high-level flowchart illustrating various methods and techniques to implement a writer to generate invocation statements based on structured data templates and different portions of structured data, according to some embodiments.

FIG. 7 is a high-level flowchart illustrating various methods and techniques to implement a writer to generate invocation statements based on structured data templates and different portions of structured data, according to some embodiments. These techniques, as well as the techniques discussed with regard to FIG. 8, may be implemented using components or systems as described above with regard to FIGS. 1-6, as well as other types of components or systems, and thus the following discussion is not intended to be limiting as to the other types of systems that may implement the described techniques.

As indicated at block 702, a writer generates a table that includes one or more structured data templates. A structured data template may specify fields, relationships between fields, and a set of indicators that a field value has not been assigned to a set of fields. In embodiments, there may be any number of indicators in the set (e.g., zero or more indicators that respectively indicate zero or more corresponding fields are unassigned). At block 704, the writer sends the table of one or more structured data templates to a destination. In embodiments, the one or more structured data templates may be sent, without sending any table or reference to a table.

At block 706, the writer determines whether there are any more portions of source data to process (e.g., to read from a source data store). If not, then at block 708, the self-described data encoding is complete. If there are one or more portions of source data to process, then at block 710, the writer determines if the next portion(s) of data match one of the structured data templates. If the next portion of data does not match any structured data templates, then at block 712 the writer (or other process) determines whether to create a new structured data template that can be used to process the portion of data and any other subsequent portions of data that have the same particular fields and/or the same particular structure (e.g., relationships between the fields). For example, the writer may create the new structured data template if the writer determines that it has encountered a threshold number of data portions that have the same particular fields and/or the same particular structure (e.g., 10, 50, 100 times).

If the writer determines not to create a new structured data template, then at block 714, the writer may send the portion of data to a destination as raw source data (e.g., without any processing/encoding of the portion of data). The process may then return to block 706, to determine whether there are any more portions of source data to read from a source data store. Returning to block 712, if the writer determines to create a new structured data template, then at block 716, the writer creates the new structured data template and sends it to the destination. In embodiments, a reader at the destination that receives the new structured data template may append it to the template table at the destination (or otherwise make new template available) and it may be used to expand invocation statements that use the new template. The process then returns to block 710.

At block 710, if the writer may determines that a next portion of data is a structured portion of data that matches one of the structured data templates, then at block 718, the writer generates an invocation statement based on the matching structured data template and the structured portion of source data, wherein the statement specifies a value for at least one of the set of unassigned fields. As discussed herein, in various embodiments the invocation statement does not specify field names.

At block 720, the writer then sends the invocation statement to the destination. In embodiments, the destination may be another remote or local computing system or data store. The process then may then return to block 706, to determine whether there are any more portions of source data to read from a source data store.

Figure 8:
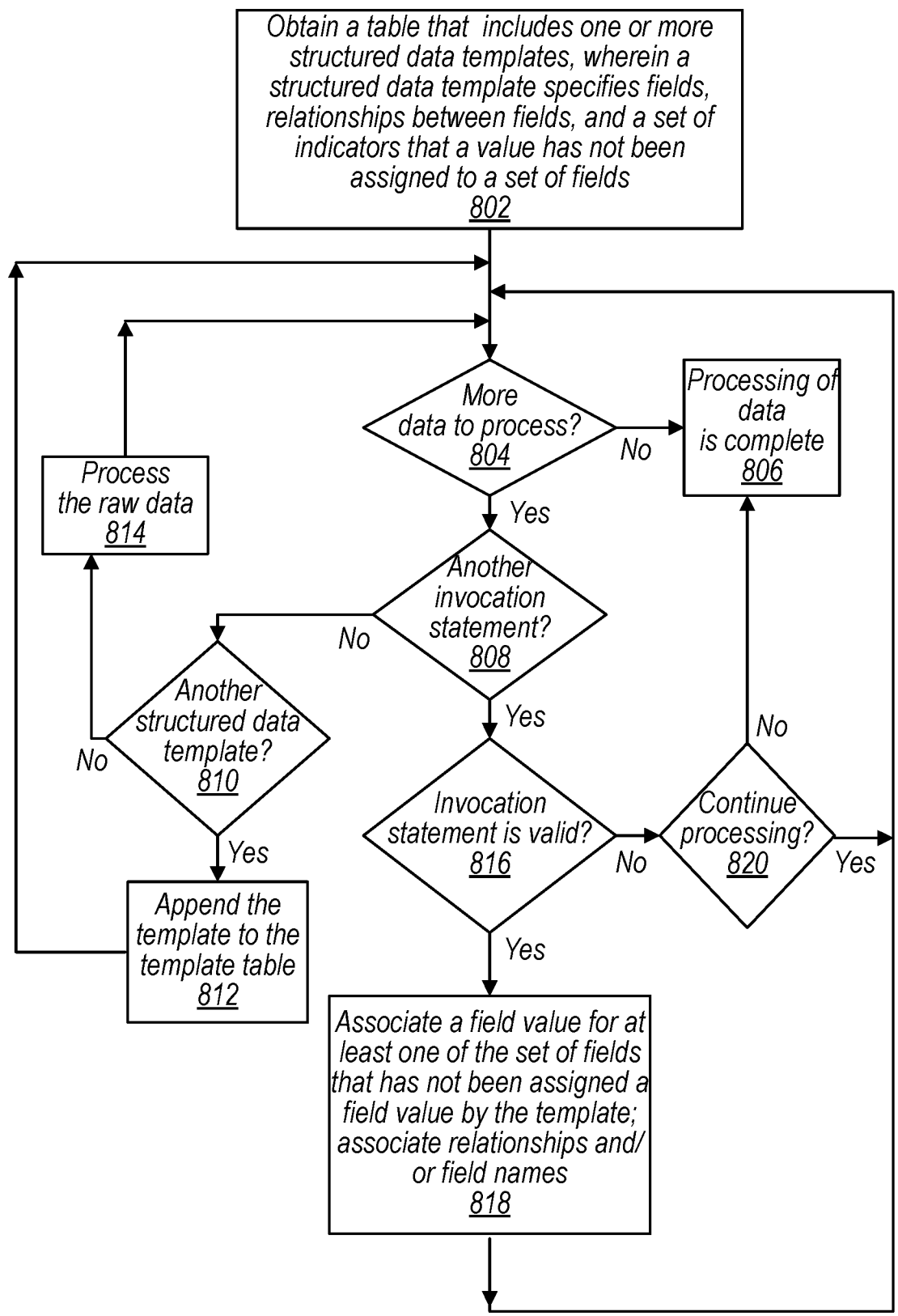
FIG. 8 is a high-level flowchart illustrating various methods and techniques to implement a reader to process invocation statements for different portions of structured data based on the structured data template, according to some embodiments.

FIG. 8 is a high-level flowchart illustrating various methods and techniques to implement a reader to process invocation statements for different portions of structured data (e.g., for consumption by a consumer process or for writing/storing onto a data store) based on the structured data template, according to some embodiments. At block 802, a reader obtains a table that includes one or more structured data templates, wherein a structured data template specifies fields, relationships between fields, and a set of indicators that a value has not been assigned to a set of fields.

At block 804, the reader determines whether there is more data to process (e.g., an additional portion of data received from a writer or other endpoint). If not, then at block 806, the decoding of the data is complete. At block 804, if the reader determines that there is more data to process, then at block 808, the reader determines whether the additional data is another invocation statement. If not, then at block 810, the reader determines whether the additional data is a structured data template. If so, then the reader appends the template to the template table at block 812 and then the process returns to block 804. Returning to block 810, if the additional data is not a structured data template, then at block 814, the reader processes the additional data as raw data. The process then returns to block 804.

Returning to block 808, if the reader determines that the additional data is another invocation statement, then at block 816, the reader determines whether the invocation statement is valid. For example, the reader may determine whether the statement references an existing template identifier and/or whether the statement is formatted correctly. If the invocation statement is valid, then at block 818, the reader associates a field value for at least one of the set of fields that has not been assigned a field value by the template (e.g., associating a value for each of the unassigned fields that the invocation statement provides a value for). The process then returns to block 804.

Returning to block 816, if the reader determines that the invocation statement is not valid, then at block 820, the reader may decide whether to continue processing. If so, then the invalid invocation statement may be rejected and/or skipped over (e.g., surface the error to the user via callback and continue processing data, silently continue, etc.). The process then returns to block 804 to determine whether there is more data to process.

At block 820, if the reader does not continue processing, then the process proceeds to block 806, where the processing of data ends (e.g., indicating an error to the client). Therefore, in some embodiments, the reader may simply stop reading any further data and/or may generate an error message that may be sent to a client and/or administrator. In embodiments, the reader may not make any decision at block 820, but instead may perform a particular action (e.g., based on the configuration of the reader). For example, at block 820, the reader may end processing (e.g., proceed to block 806). In other embodiments, at block 820, the reader may continue processing (e.g., report the error and/or return to block 804 to determine whether there is more data to process.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality readers, writers, and other components that implement the techniques described herein). The various methods as illustrated in the figures and described herein represent example embodiments of methods. The order of any method may be changed, and various elements may be added, reordered, combined, omitted, modified, etc.

Figure 9:
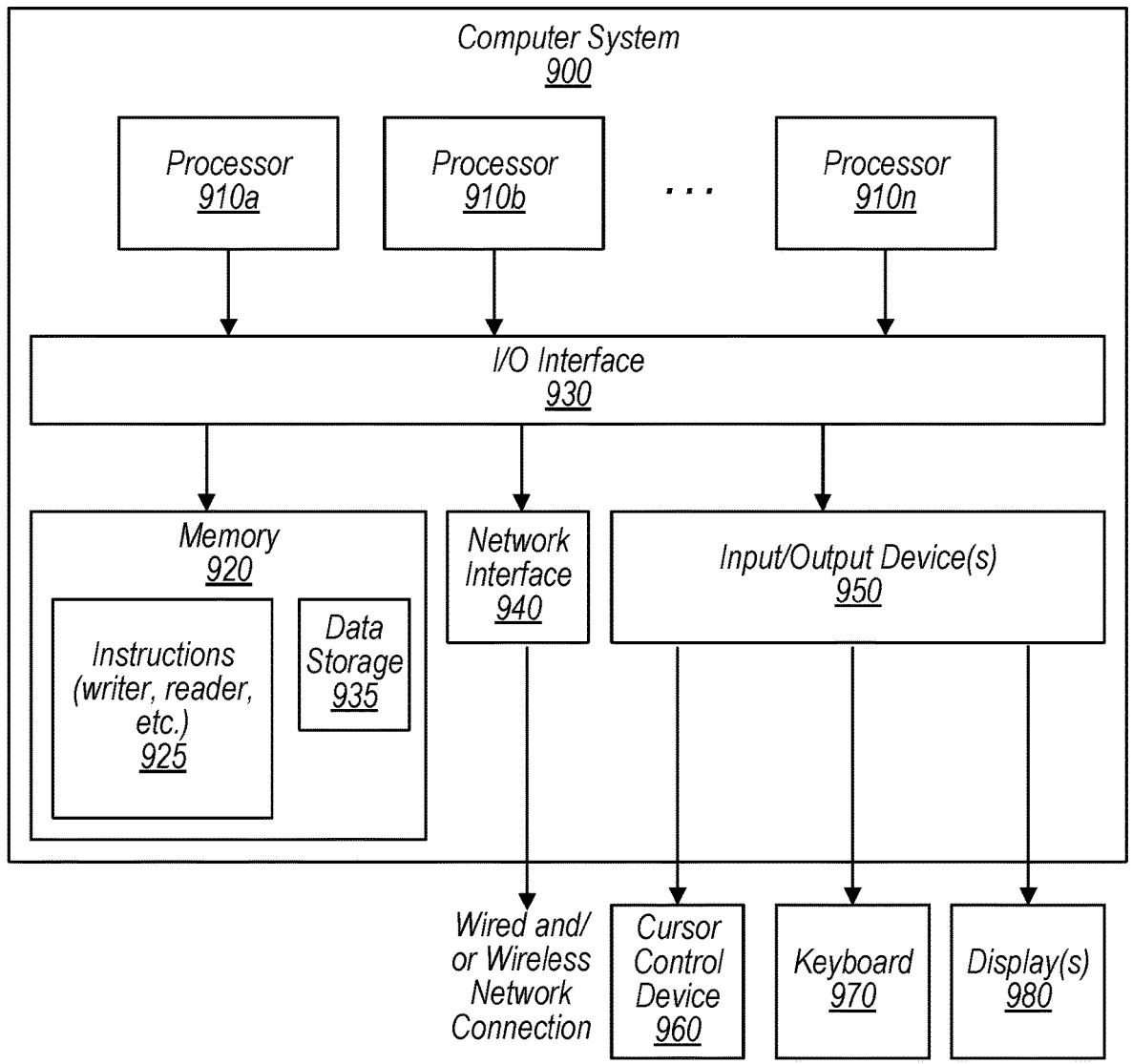
FIG. 9 is a block diagram illustrating an example computing system, according to some embodiments.

Embodiments to implement structured data templates and invocation statements to dynamically define values for efficient data encoding as described herein may be executed on one or more computer systems, which may interact with various other systems or devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) may include standard computer monitor(s) and/or other display systems, technologies or devices, in one embodiment. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions, in one embodiment. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 920 may store program instructions 925 and/or data accessible by processor 910, in one embodiment. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., reader, writer, etc.) are shown stored within system memory 920 as program instructions 925 and data storage 935, respectively. In other embodiments, program instructions and/or data may be received, sent or stored upon different types of computer-accessible media or on similar media separate from system memory 920 or computer system 900. A computer-accessible medium may include non-transitory storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940, in one embodiment.

In one embodiment, I/O interface 930 may be coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900, in one embodiment. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900, in one embodiment. Multiple input/output devices 950 may be present in computer system 900 or may be distributed on various nodes of computer system 900, in one embodiment. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, that implement the various embodiments of the systems as described herein, and data store 935, comprising various data accessible by program instructions 925, in one embodiment. In one embodiment, program instructions 925 may include software elements of embodiments as described herein and as illustrated in the Figures. Data storage 935 may include data that may be used in embodiments (e.g., source data, target data, templates, invocation statements, tables, etc.). In other embodiments, other or different software elements and data may be included.

Those skilled in the art will appreciate that computer system 900 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 900 may be transmitted to computer system 900 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors, cause the one or more processors to:
generate a table comprising structured data templates respectively corresponding to different template identifiers, wherein a given structured data template specifies:
a plurality of fields respectively comprising a field name and field value;
one or more relationships between different fields of the plurality of fields; and
an indicator that one or more of the field values is unassigned; and
generate a plurality of invocation statements based on the structured data templates and structured portions of source data, wherein a given invocation statement based on the given structured data template and a given structured portion of the source data comprises:
a reference to a template identifier of the given structured data template; and
a value for at least one of the unassigned field values, wherein the value is based on the given structured portion of the source data;
wherein different ones of the invocation statements that are based on the given structured data template comprise different values for the at least one of the unassigned field values, and
wherein the plurality of invocation statements do not specify the field names of the plurality of fields; and
send the structured data templates and the plurality of invocation statements to a destination as a self-described data encoding.

2. The system of claim 1, wherein the one or more relationships between different fields specified by the given structured data template comprises:
an order of the plurality of fields.

3. The system of claim 1, wherein the given invocation statement indicates:
a type of the value for the at least one of the unassigned field values.

4. The system of claim 3, wherein the value for the at least one of the unassigned field values comprises a plurality of values, and wherein the given invocation statement indicates:
the type of the value for the at least one of the unassigned field values is a list of values.

5. The system of claim 1, wherein to generate the given invocation statement based on the given structured portion of the source data, the instructions cause the one or more processors to:
determine that at least one or more fields of the given structured portion of the source data match one or more respective fields of the given structured data template; and
in response to the determination that the at least one or more fields of the given structured portion of the source data match the one or more respective fields of the given structured data template:
write the reference to the template identifier of the given structured data template; and
write the value for the at least one of the unassigned field values, wherein the value for the at least one of the unassigned field values is provided by the given structured portion of the source data.

6. A method, comprising:
performing, by one or more computing devices:
generate a plurality of invocation statements based on a structured data template and a plurality of structured portions of source data, wherein the structured data template specifies a plurality of fields, one or more relationships between the fields, and a set of indicators that a field value has not been assigned to a set of the fields, and wherein a given invocation statement based on the structured data template and a given structured portion of the source data comprises:
a reference to a template identifier of the structured data template; and
the field value for at least one of the set of unassigned fields, wherein the field value for the at least one of the set of unassigned fields is based on the given structured portion of the source data; and
send the structured data template and the plurality of invocation statements to a destination as a self-described data encoding.

7. The method as recited in claim 6, wherein the one or more relationships between the fields specified by the structured data template comprises:
an order of the plurality of fields.

8. The method as recited in claim 6, wherein the one or more relationships between the fields specified by the structured data template comprises:
a nested structure that two of more of the plurality of fields belong to, wherein one or more remaining fields of the plurality of fields do not belong to the nested structure.

9. The method as recited in claim 6, wherein the given invocation statement indicates:
a type of the value for the at least one of the unassigned field values.

10. The method as recited in claim 6, wherein another structured data template is defined based on a reference to the structured data template, and wherein the other structured data template specifies at least one value for at least one of the one or more fields.

11. The method as recited in claim 10, wherein the other structured data template specifies at least another indicator that a field value has not been assigned to at least another field of the other structured data template.

12. The method as recited in claim 6, wherein another structured portion of the source data does not include a particular field of the plurality of fields, and wherein another invocation statement based on the structured data template and the other structured portion of the source data comprises:
another reference to the template identifier of the structured data template; and
an indicator that the particular field is suppressed.

13. The method as recited in claim 6, wherein another structured portion of the source data includes the plurality of fields and at least one additional field, and wherein another invocation statement based on the structured data template and the other structured portion of the source data comprises:
- another reference to the template identifier of the structured data template; and
- a specification of a field name and a field value for the at least one additional field.

14. The method as recited in claim 6, wherein generating the given invocation statement based on the structured data template and the given structured portion of the source data comprises:
- determining that fields and one or more relationships between fields of the given structured portion of the source data match respective fields and one or more respective relationships between fields of the structured data template; and
- in response to the determination that the fields and one or more relationships between fields of the given structured portion of the source data match respective fields and one or more respective relationships between fields of the structured data template:
  - write the reference to the template identifier of the structured data template; and
  - write the field value for the at least one of the one or more unassigned fields, wherein the field value for the at least one of the one or more unassigned fields is provided by the given structured portion of the source data.

15. One or more non-transitory computer-accessible storage media storing program instructions that when executed on or across one or more processors cause the one or more processors to:
- generate a plurality of invocation statements based on a structured data template and a plurality of structured portions of source data, wherein the structured data template specifies a plurality of fields, one or more relationships between the fields, and a set of indicators that a field value has not been assigned to a set of the fields, and wherein a given invocation statement based on the structured data template and a given structured portion of the source data comprises:
  - a reference to a template identifier of the structured data template; and
  - the field value for at least one of the set of unassigned fields, wherein the field value for the at least one of the set of unassigned fields is based on the given structured portion of the source data; and
- send the structured data template and the plurality of invocation statements to a destination as a self-described data encoding.

16. The one or more storage media as recited in claim 15, wherein the one or more relationships between the fields specified by the structured data template comprises:
- an order of the plurality of fields, or
- a nested structure that two or more of the plurality of fields belong to, wherein one or more remaining fields of the plurality of fields do not belong to the nested structure.

17. The one or more storage media as recited in claim 15, wherein the given invocation statement indicates a type of the value for the at least one of the unassigned field values.

18. The one or more storage media as recited in claim 15, wherein another structured data template is defined based on a reference to the structured data template, and wherein the other structured data template specifies at least one value for at least one of the one or more fields.

19. The one or more storage media as recited in claim 15, wherein the other structured data template specifies at least another indicator that a field value has not been assigned to at least another field of the other structured data template.

20. The one or more storage media as recited in claim 15, wherein another structured portion of the source data does not include a particular field of the plurality of fields, and wherein another invocation statement based on the structured data template and the other structured portion of the source data comprises:
- another reference to the template identifier of the structured data template; and
- an indicator that the particular field is suppressed.

* * * * *